(12) United States Patent
Williams

(10) Patent No.: US 10,458,186 B2
(45) Date of Patent: Oct. 29, 2019

(54) SACRIFICIAL SPACER FOR WELL TOOL INNER SEAL

(71) Applicant: Halliburton Energy Services, Inc., Houston, TX (US)

(72) Inventor: Mark E. Williams, Conroe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 645 days.

(21) Appl. No.: 14/911,447

(22) PCT Filed: Sep. 10, 2013

(86) PCT No.: PCT/US2013/058951
§ 371 (c)(1),
(2) Date: Feb. 10, 2016

(87) PCT Pub. No.: WO2015/038094
PCT Pub. Date: Mar. 19, 2015

(65) Prior Publication Data
US 2016/0194918 A1    Jul. 7, 2016

(51) Int. Cl.
*E21B 10/25* (2006.01)
*F16J 15/02* (2006.01)
(Continued)

(52) U.S. Cl.
CPC ............... *E21B 10/25* (2013.01); *E21B 10/22* (2013.01); *F16J 15/002* (2013.01); *F16J 15/02* (2013.01);
(Continued)

(58) Field of Classification Search
CPC .... E21B 10/22; E21B 10/25; E21B 2010/225; F16J 15/002; F16J 15/02; F16J 15/162
See application file for complete search history.

(56) References Cited

U.S. PATENT DOCUMENTS

| 4,337,956 | A | * | 7/1982 | Hopper | F16J 15/3232 277/552 |
| 5,362,073 | A | * | 11/1994 | Upton | E21B 10/25 175/371 |

(Continued)

FOREIGN PATENT DOCUMENTS

| CN | 101517189 | 8/2009 |
| CN | 101967956 | 2/2011 |
| CN | 102628338 | 8/2012 |

OTHER PUBLICATIONS

International Search Report and Written Opinion, Application No. PCT/US2013/058951, 17 pages, dated Jun. 24, 2014.

(Continued)

*Primary Examiner* — Robert E Fuller
*Assistant Examiner* — Christopher J Sebesta
(74) *Attorney, Agent, or Firm* — Baker Botts L.L.P.

(57) ABSTRACT

A well tool can include inner and outer seals interposed between components of the well tool, and a circumferential spacer which prevents contact between the inner seal and one of the components which displaces relative to the inner seal. A method of sealing between components of a well tool can include sealingly engaging an outer seal between the components, and disposing an inner seal between the components, including spacing the inner seal away from one of the components, whereby the inner seal sealingly contacts one of the components only after the well tool is disposed in a well. A drill bit can include inner and outer seals interposed between components of the drill bit, and a circumferential spacer which prevents contact between the inner seal and one of the components, the circumferential spacer being positioned upstream of the outer seal relative to a lubricant supply of the drill bit.

16 Claims, 7 Drawing Sheets

(51) Int. Cl.
*E21B 10/22* (2006.01)
*F16J 15/00* (2006.01)
*F16J 15/16* (2006.01)

(52) U.S. Cl.
CPC ....... *F16J 15/162* (2013.01); *E21B 2010/225* (2013.01)

(56) References Cited

U.S. PATENT DOCUMENTS

| | | |
|---|---|---|
| 6,033,117 A | 3/2000 | Cariveau |
| 6,254,275 B1 | 7/2001 | Slaughter et al. |
| 6,305,483 B1 | 10/2001 | Portwood |
| 6,336,512 B1 | 1/2002 | Siracki et al. |
| 6,536,542 B1* | 3/2003 | Fang ................ E21B 10/25 175/371 |
| 6,598,690 B2 | 7/2003 | Peterson |
| 6,976,548 B2 | 12/2005 | Neville et al. |
| 7,201,241 B2 | 4/2007 | Neville et al. |
| 7,387,178 B2 | 6/2008 | Neville et al. |
| 7,628,231 B2 | 12/2009 | Lin |
| 9,238,944 B2 | 1/2016 | Tian et al. |
| 2003/0019666 A1 | 1/2003 | Portwood et al. |
| 2003/0024743 A1* | 2/2003 | Peterson ............ E21B 10/25 175/371 |
| 2003/0094766 A1* | 5/2003 | Byrd .................. E21B 10/25 277/549 |
| 2004/0040747 A1* | 3/2004 | Neville .............. E21B 10/25 175/57 |
| 2006/0032673 A1 | 2/2006 | Yong et al. |
| 2006/0096782 A1 | 5/2006 | Neville et al. |
| 2008/0073124 A1* | 3/2008 | Lin .................... E21B 10/22 175/371 |
| 2010/0089657 A1 | 4/2010 | Lin |
| 2013/0153304 A1 | 6/2013 | Crawford |

OTHER PUBLICATIONS

Office Action for Chinese Patent Application No. 201380078456.3, dated Oct. 14, 2016; 10 pages.
Office Action for Chinese Patent Application No. 201380078456.3, dated Jun. 15, 2017, no English translation; 3 pages.
International Preliminary Report on Patentability for PCT Patent Application No. PCT/US2013/058951, dated Mar. 24, 2016; 14 pages.

\* cited by examiner

SACRIFICIAL SPACER FOR WELL TOOL INNER SEAL

RELATED APPLICATION

This application is a U.S. National Stage Application of International Application No. PCT/US2013/058951 filed Sep. 10, 2013, which designates the United States, and which is incorporated herein by reference in its entirety.

TECHNICAL FIELD

This disclosure relates generally to equipment utilized and operations performed in conjunction with a subterranean well and, in one example described below, more particularly provides a well tool inner seal with a circumferential spacer that temporarily prevents sealing engagement of the inner seal with a component of the well tool.

BACKGROUND

A well is a particularly harsh environment for seals. Dynamic seals can fail prematurely due to the seals being exposed to well fluids and abrasive particles in a well.

Therefore, it will be appreciated that improvements are continually needed in the art of sealing between components of well tools. Such improvements may be useful whether or not dynamic sealing is involved.

DETAILED DESCRIPTION

Figure 1:
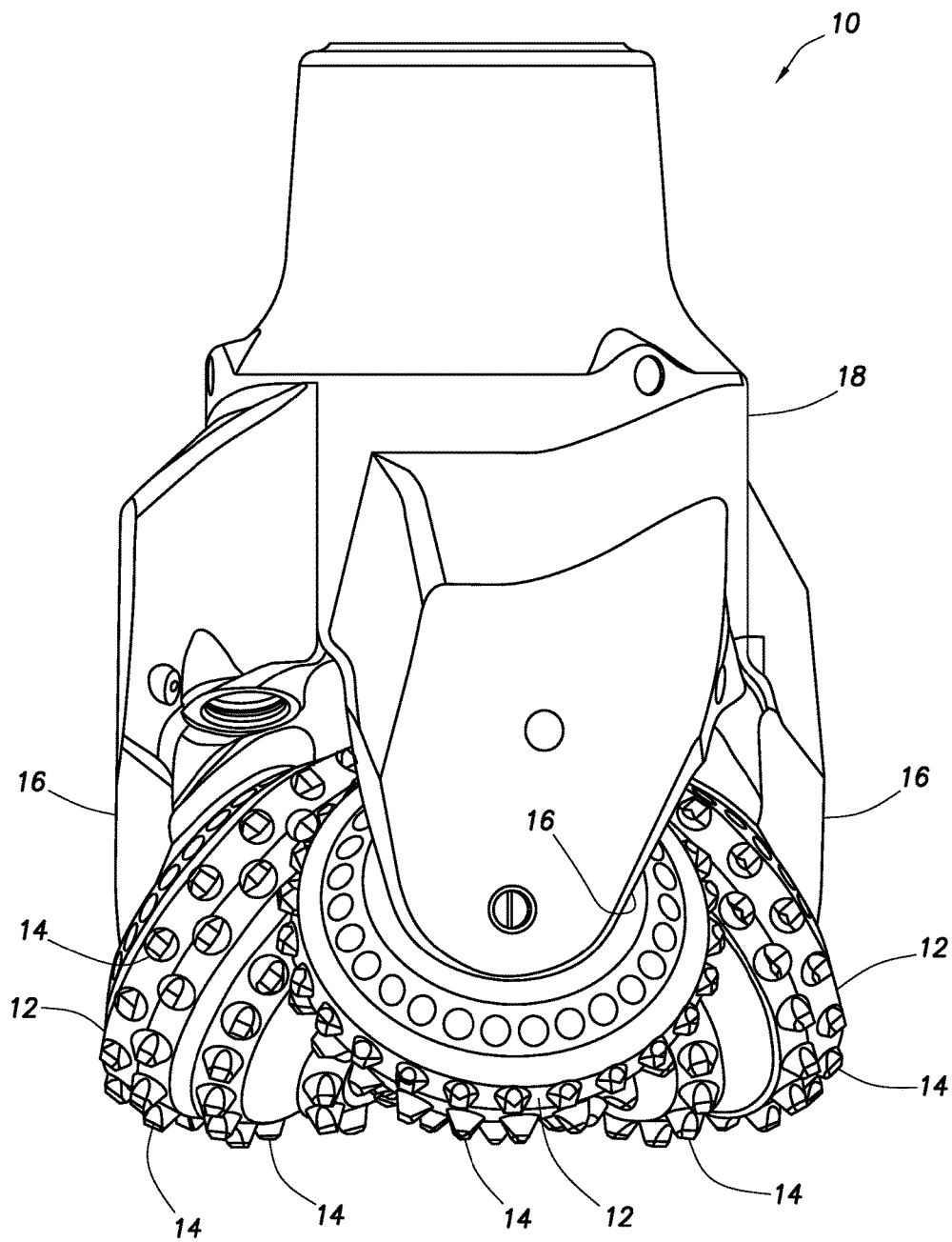
FIG. 1 is a representative partially cross-sectional view of a well tool which can embody principles of this disclosure.

Representatively illustrated in FIG. 1 is a well tool 10 which can embody principles of this disclosure. However, it should be clearly understood that the well tool 10 and methods associated therewith are merely one example of an application of the principles of this disclosure in practice, and a wide variety of other examples are possible. Therefore, the scope of this disclosure is not limited at all to the details of the drill bit 10 and method described herein and/or depicted in the drawings.

In the FIG. 1 example, the well tool 10 is a drill bit of the type known to those skilled in the art as a roller cone bit or a tri-cone bit, due to its use of multiple generally conical-shaped rollers or cones 12 having earth-engaging cutting elements 14 thereon. However, other types of well tools (such as, drilling stabilizers, reamers, etc.) can also incorporate the principles of this disclosure.

Each of the cones 12 is rotatably secured to a respective arm 16 extending downwardly (as depicted in FIG. 1) from a main body 18 of the drill bit. In this example, there are three each of the cones 12 and arms 16.

However, it should be clearly understood that the principles of this disclosure may be incorporated into drill bits having other numbers of cones and arms, other types of cutting structures (e.g., not necessarily cones and cutting elements) and other types of drill bits and drill bit configurations. The drill bit depicted in FIG. 1 is merely one example of a wide variety of drill bits which can utilize the principles described herein.

Figure 2:
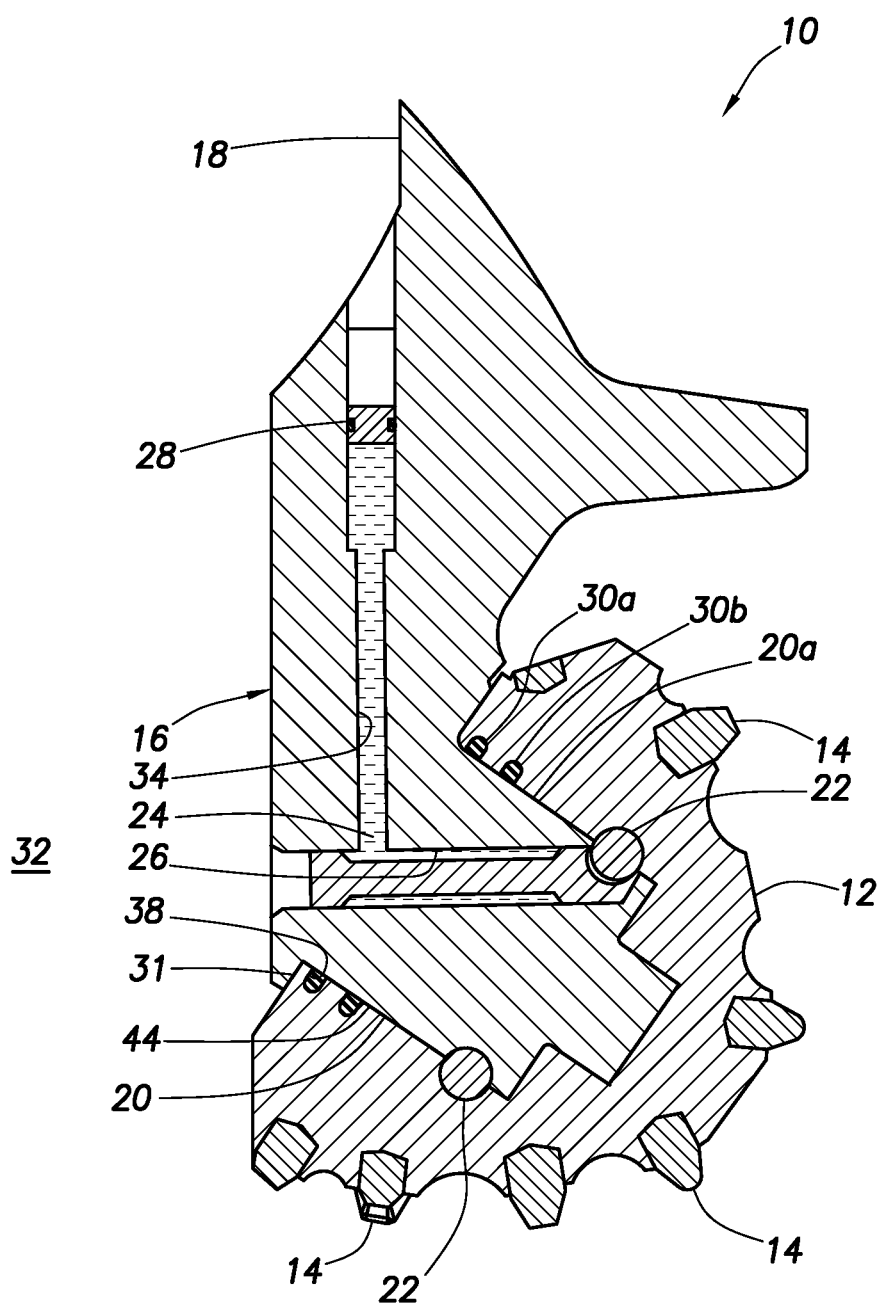
FIG. 2 is a representative cross-sectional view of an arm of the well tool.

FIG. 2 is a representative cross-sectional view of one of the arms 16 of the well tool 10. In this view, it may be seen that the cone 12 rotates about a journal 20 of the arm 16. Retaining balls 22 are used between the cone 12 and the journal 20 to secure the cone on the arm 16.

Lubricant is supplied between the cone 12 and the journal 20 via a passage 26 from a lubricant supply 24 in an internal chamber 34. A pressure compensator 28 (including, for example, a floating piston or a diaphragm) ensures that the lubricant supply 24 in the chamber 34 is at substantially a same pressure as a well environment on an exterior 32 of the drill bit, when the drill bit is being used to drill a wellbore. In some examples, the compensator 28 may be configured to maintain a predetermined pressure differential between the lubricant supply 24 and the well environment (for example, by providing a differential piston area on a piston).

An annular space 44 (visible in more detail in FIGS. 3 & 4) is formed radially between the cone 12 and the journal 20, to provide ample clearance for the cone 12 to fit over the journal 20 and to freely rotate with respect thereto. An annular fluid entry path 31 is generally indicated at 31, which is a location where fluid from the well environment 32 may have a tendency to enter the annular space 44. A pair of seals 30a,b are therefore provided to prevent debris and well fluids from entering the annular space 44 from one end of the pair of seals 30a,b, and to prevent escape of the lubricant from the annular space 44 and the lubricant supply 24 from the other end of the pair of seals 30a,b. The seals 30a,b in this example embodiment are received in glands or grooves 38 formed in the cone 12. Although two seals 30a,b are depicted in the drawings, any number of seals may be used in keeping with the scope of this disclosure.

As the cone 12 rotates about the journal 20, the seals 30a,b preferably rotate with the cone 12 and slidingly seal against an outer surface 20a of the journal 20. However, in other examples, the seals 30a,b could remain stationary on the journal 20. For example, the seals 30a,b could be disposed in grooves formed on the journal 20, with the cone 12 rotating relative to the journal 20 and seals 30a,b such that the seals 30a,b instead slidingly seal against the cone 12. In some examples, the seals 30a,b could rotate relative to another stationary surface, such as, a relief or boss (not shown) formed on the journal 20, or a sleeve (not shown) made of a different material attached sealingly to the journal.

The cone 12 and the journal 20 are two components of the well tool 10, between which it is desired to seal using the seals 30a,b. In other drill bits, or in other types of well tools, it may be desired to seal between other components. Therefore, it should be clearly understood that the scope of this disclosure is not limited to sealing between a cone and a journal. The seals 30a,b (or other seals) may be used for sealing between any types of well tool components, in keeping with the principles of this disclosure.

The seal 30a is referred to as an "outer" seal in the further description below, since it is the first of the two seals 30a,b to be exposed to any fluids from the well environment 32 that may enter the annular space 44 along the annular fluid entry path 31. The other seal 30b is referred to as an "inner" seal in the further description below, since it is downstream from the outer seal 30a with respect to the annular fluid entry path 31 and is therefore not exposed to fluids from the well environment 32, unless the outer seal 30a fails to perform its sealing function.

Figure 3:
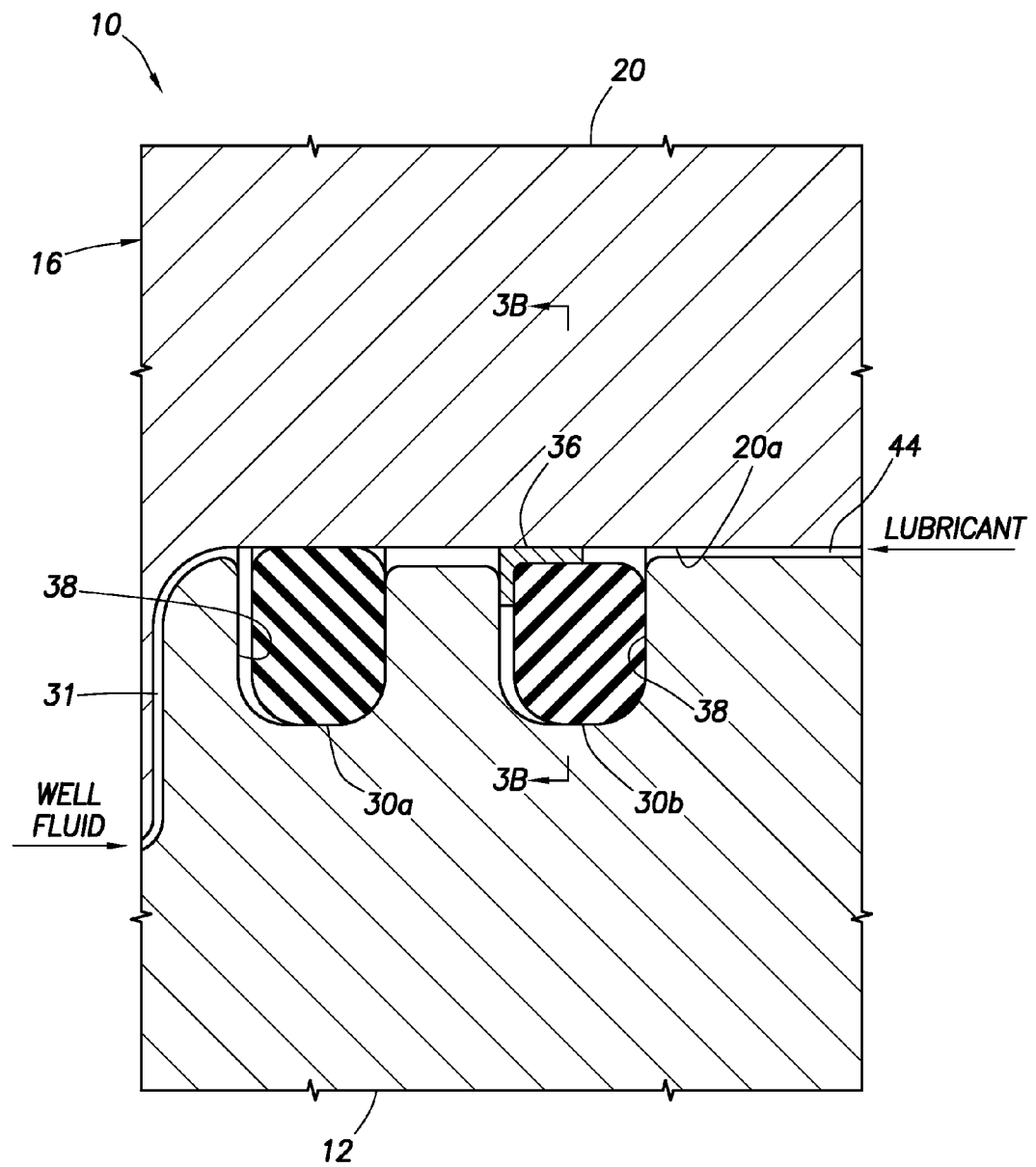
FIG. 3 is a representative enlarged scale cross-sectional view of inner and outer seals between components of the well tool.

FIG. 3 is a representative enlarged scale cross-sectional view of the components (cone 12 and journal 20) of the well tool 10, further detailing aspects of the outer and inner seals 30a,b and the cooperative relationship between the seals 30a,b and components of the well tool 10. In this view, it may be seen that a sacrificial, circumferentially-formed spacer (i.e., "circumferential spacer") 36 radially spaces the inner seal 30b radially away from the surface 20a of the journal 20. The circumferential spacer 36 may be substantially coaxial with a rotational axis of the cone 12 about the journal 20. Although not strictly required in all embodiments, the circumferential spacer 36 in this embodiment completely encircles the journal 20, and thus seals along substantially a full 360 degrees of a circumference of the journal 20. Thus, the inner seal 30b may be constructed and oriented with respect to the journal 20 such that it does not sealingly engage the journal 20 at any location along the circumference of the journal 20 when the well tool 10 is initially constructed.

The outer seal 30a does sealingly engage the journal 20 (and the corresponding groove 38), and so the outer seal is at least initially effective to prevent well fluid from entering the well tool 10 where it could, for example, contaminate the lubricant therein, and cause excessive friction and wear between the cone 12 and the journal. However, since there is relative motion between the cone 12 and the journal 20, the outer seal 30a is a dynamic seal and over time abrasive particles in the well fluid and/or irregularities on the surface 20a can cause erosion, wear or other damage to the outer seal, so that it no longer performs its sealing function.

Figure 3B:
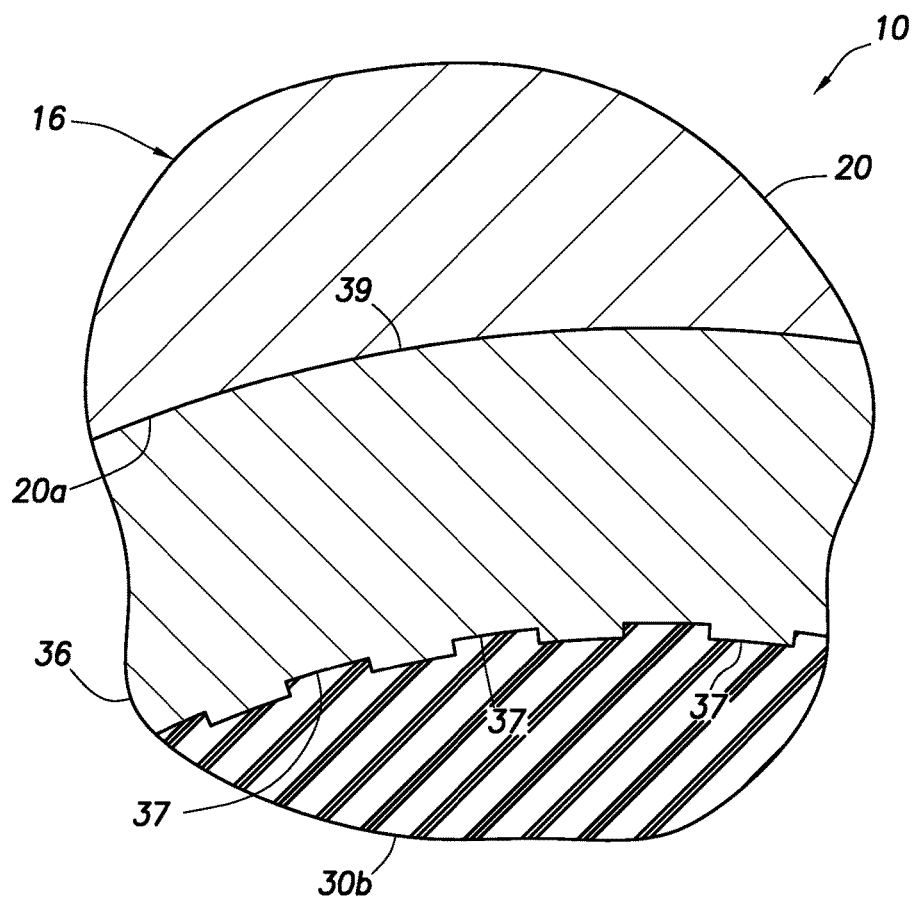
FIG. 3B is a representative further enlarged scale cross-sectional view of the inner seal, a component of the well tool and a circumferential spacer therebetween, taken along line 3B-3B of FIG. 3.

The circumferential spacer 36 radially spaces the inner seal 30b away from the surface 20a initially. As the cone 12 rotates about the journal 20, the seal 30b rotates with the cone 12, as described above. Through deliberate selection of material configuration and parameters, the circumferential spacer 36 also moves along with the cone 12 and inner seal 30b as the cone 12 rotates about the journal 20. For example, the friction coefficients and the corresponding relative friction between the cone 12 and the inner seal 30b, between the inner seal 30b and the circumferential spacer 36, and/or between the circumferential spacer 36 and journal 20, may be selected so that there is greater friction between the inner seal 30b and the circumferential spacer 36 than between the circumferential spacer 36 and the journal 20. As another example detailed in FIG. 3B, a surface of the circumferential spacer 36 that contacts the inner seal 30b may be textured or otherwise formed with protrusions and/or recesses 37 to increase friction between the spacer 36 and the inner seal 30b, while an opposing surface 39 of the circumferential spacer 36 in engagement with the journal 20 may be smooth for reduced friction. Thus, initially, while the outer seal 30a remains intact and performs its sealing function, there is relative motion (sliding) between the circumferential spacer 36 and the journal 20 but not between the inner seal 30b and either of the cone 12 or circumferential spacer 36. Thus, there is no appreciable sliding between the inner seal 30b and adjacent parts so that the inner seal does not appreciably wear for all (or substantially all) of the time that the outer seal 30a is sealing against the surface 20a. Thus, the inner seal 30b does not serve as a dynamic seal as long as the circumferential spacer 36 spaces it away from the surface 20a. The circumferential spacer 36 can be made of a material (such as, poly-tetra-fluoro-ethylene (PTFE) or poly-ether-ether-ketone (PEEK)) having a relatively low coefficient of friction against the surface 20a, so that the surface does not wear appreciably due to sliding contact between the spacer and the surface.

If the outer seal 30a begins to leak, the well fluid and abrasive particles can then enter the space 44 between the outer and inner seals 30a,b. The circumferential spacer 36 will then be exposed to the well fluid and abrasive particles, and will relatively quickly wear away to allow the inner seal 30b to sealingly contact the surface 20a. For this purpose, the circumferential spacer 36 can be made of a material selected to have a relatively low coefficient of friction, and relatively low abrasion resistance.

Thus, the outer and inner seals 30a,b perform their sealing functions in series time-wise, rather than in parallel as in prior tandem seal designs (although there may be some overlap between the outer seal 30a sealing and the inner seal 30b sealing, depending on when the circumferential spacer 36 permits the inner seal to contact the surface 20a). This extends an amount of time in which there is effective sealing between the cone 12 and journal 20, because the seal 30b only begins dynamically sealing against the surface 20a (and thereby wearing) after the circumferential spacer 36 is sufficiently worn to permit the inner seal to contact the journal.

Note that, although only one inner seal 30b is depicted in the drawings, any number of inner seals may be used. For example, an additional inner seal and circumferential spacer could be arranged to the lubricant side of the inner seal 30b, so that if the inner seal 30b fails to perform its sealing function, the additional inner seal could then sealingly engage the surface 20a as described above for the inner seal 30b. Therefore, the scope of this disclosure is not limited to any particular number or arrangement of seals in the well tool 10.

Figure 4:
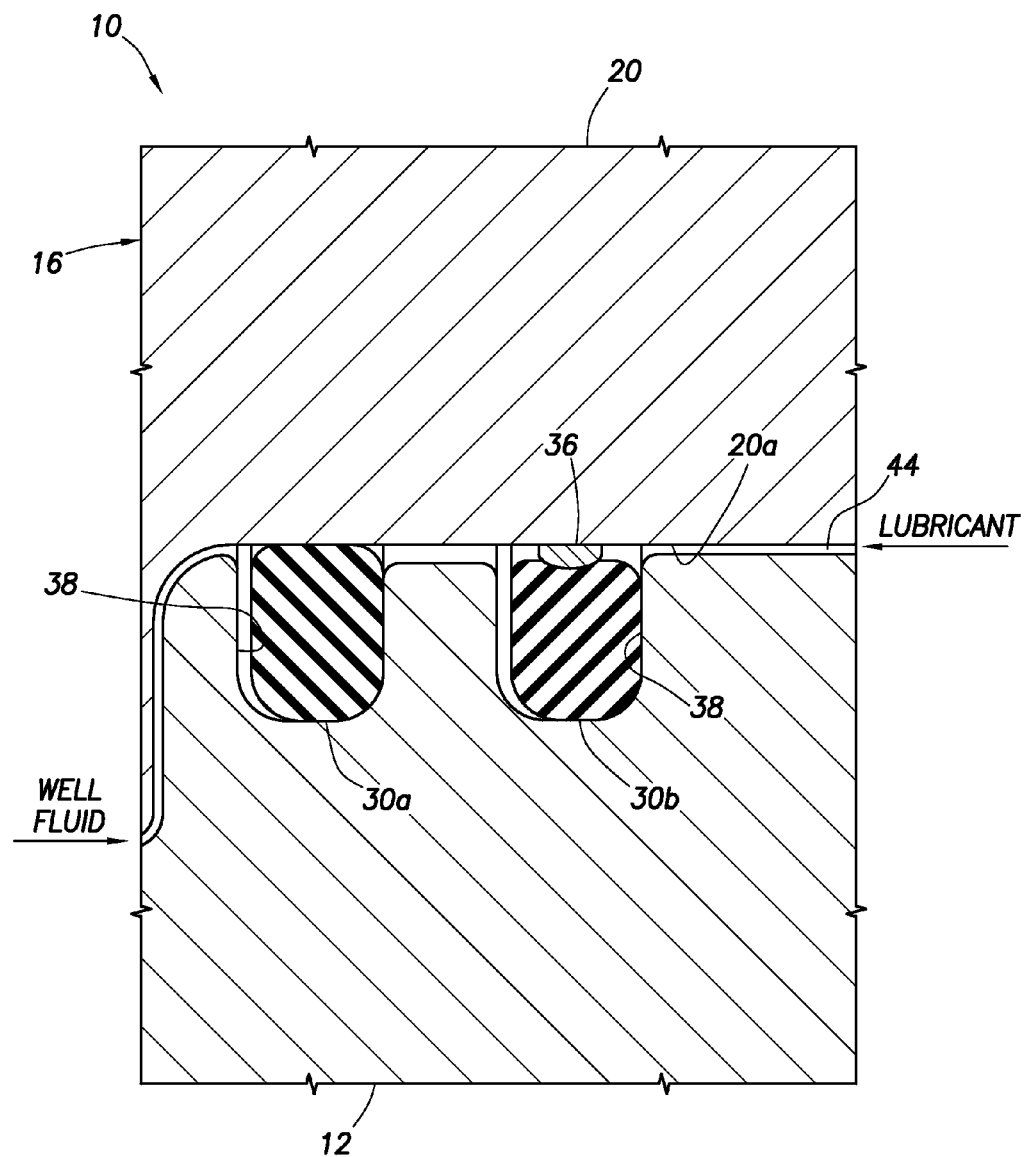
FIG. 4 is a representative cross-sectional view of another example of the inner and outer seals.

FIG. 4 is a representative cross-sectional view of another example of the outer and inner seals 30a,b and circumferential spacer 36. In this example, the circumferential spacer 36 has a rounded and somewhat oblong cross-section, with a flat side contacting the surface 20a, and a rounded side contacting the inner seal 30b.

In contrast, the FIG. 3 circumferential spacer 36 example is rectangular in form, with two arms extending at right angles to each other, one arm being positioned between the inner seal 30b and the surface 20a, and the other arm being positioned on a side of the inner seal facing the outer seal 30a. Thus, it should be appreciated that the scope of this disclosure is not limited to any particular configuration of the circumferential spacer 36.

Figure 7:
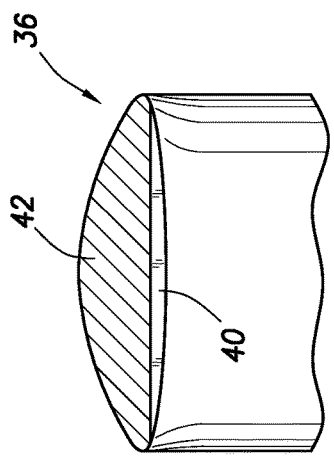
FIGS. 5-7 are representative further enlarged scale cross-sectional views of examples of circumferential spacers that may be used with the well tool.
Figure 6:
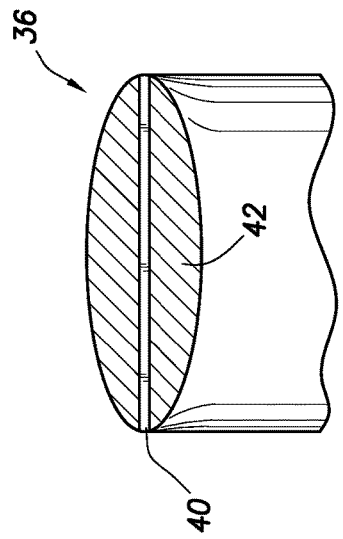
Figure 5:
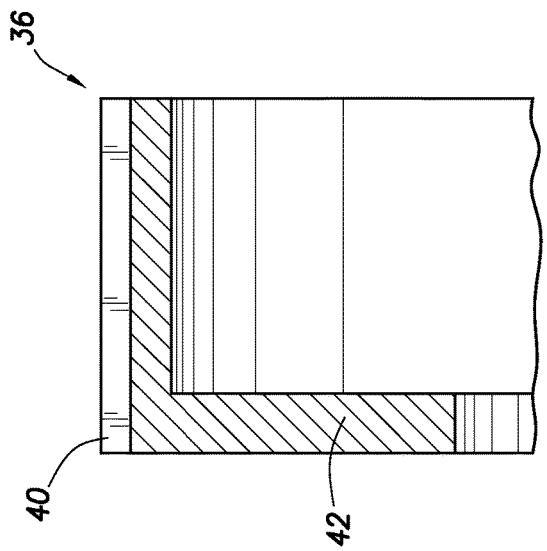

FIGS. 5-7 are representative further enlarged scale cross-sectional views of other examples of circumferential spacers 36 that may be used with the well tool 10. In these examples, an equalizing passage 40 is formed in a material 42 of the circumferential spacer 36. As discussed above, the spacer material 42 preferably provides a relatively low coefficient of friction against the surface 20a, but may also have a relatively low abrasion resistance.

The equalizing passage 40 provides for fluid communication across the circumferential spacer 36, between opposite sides of the inner seal 30b. In this manner, the lubricant can flow into the annular space 44 between the outer and inner seals 30a,b. In addition, a buildup of differential pressure across the inner seal 30b and circumferential spacer 36 is prevented.

These objectives can be achieved using the equalizing passage 40, without a need for a separate pressure equalizing device as in prior tandem seal designs. However, a separate pressure equalizing device could be used, in substitution for (or in addition to) the equalizing passage 40, without departing from the principles of this disclosure.

In the FIG. 5 example, the circumferential spacer 36 is shaped similar to the circumferential spacer example depicted in FIG. 3, and the equalizing passage 40 is formed on an outer surface of the circumferential spacer. Thus, the journal surface 20a (see FIG. 3) will close off one side of the passage 40 when the circumferential spacer 36 is installed in the well tool 10.

In the FIG. 6 example, the equalizing passage 40 is formed internally through the material 42 of the circumferential spacer 36. The circumferential spacer 36 is shaped somewhat similar to the FIG. 4 example, but has rounded convex inner and outer surfaces.

In the FIG. 7 example, the circumferential spacer 36 is shaped somewhat similar to the FIG. 4 example, but a more planar inner surface contacts the inner seal 30b (see FIG. 4) and a more rounded outer surface contacts the journal surface 20a. The equalizing passage 40 is formed on the inner surface of the circumferential spacer 36. Thus, the inner seal 30b (see FIG. 4) will close off one side of the passage 40 when the circumferential spacer 36 is installed in the well tool 10.

Figure 8:
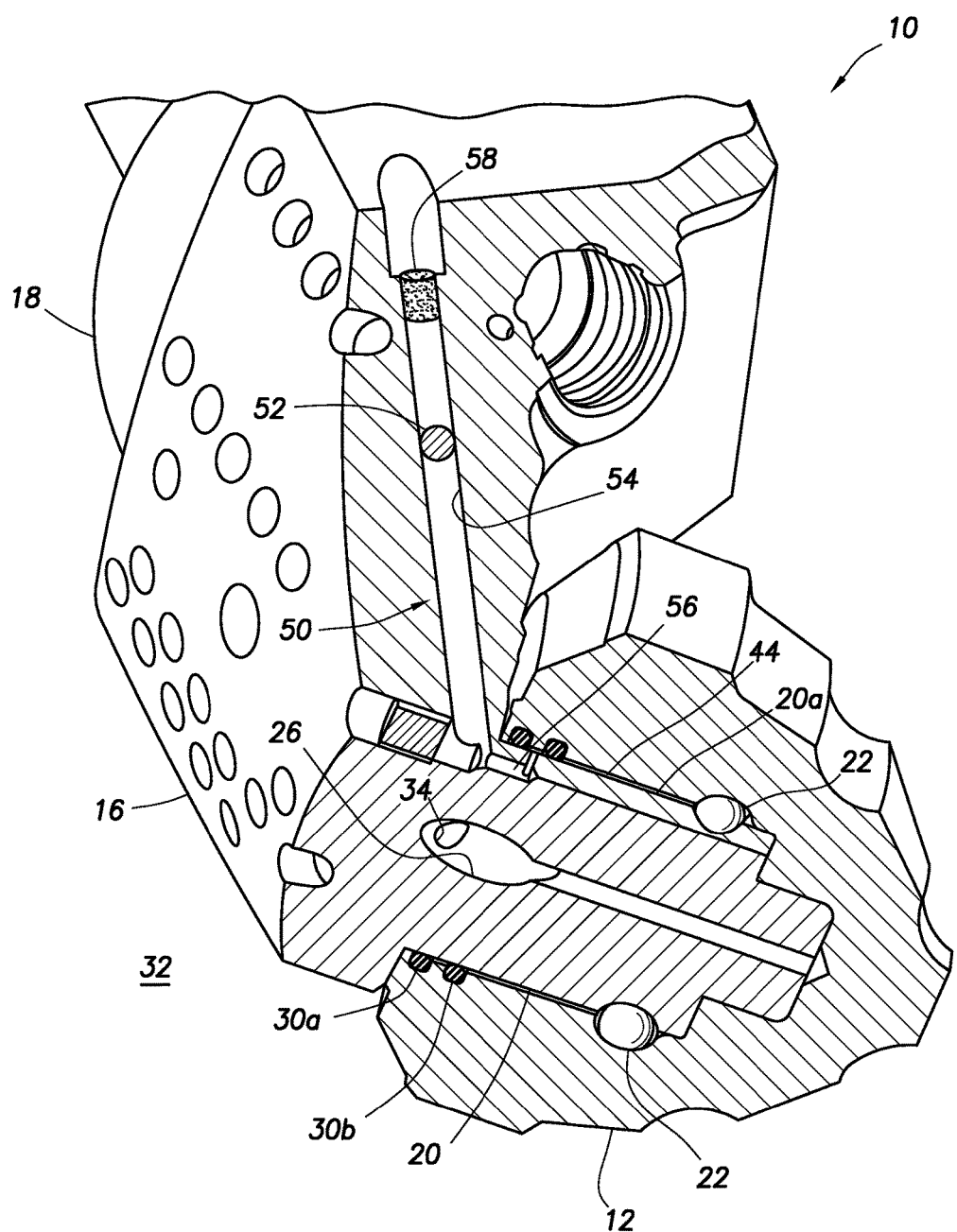
FIG. 8 is a representative cross-sectional view of a pressure equalizing device of the well tool.

As mentioned above, a separate pressure equalizing device could be used, in substitution for (or in addition to) the equalizing passage 40 depicted in FIGS. 5-7. In FIG. 8, a cross-sectional view of such a pressure equalizing device 50 is representatively illustrated.

The pressure equalizing device 50 is used in this example to equalize pressure between the well environment on the exterior 32 of the well tool 10 and the annular space 44 between the seals 30a,b. In other examples, a pressure compensator could instead be used to maintain a predetermined pressure differential between the exterior 32 and the annular space 44 between the seals 30a,b.

In the FIG. 8 example, the pressure equalizing device 50 includes an equalizing piston 52 slidingly and sealingly received in a chamber 54. The chamber 54 is in fluid communication with a passage 56 which, in turn, is in fluid communication with the annular space 44 between the seals 30a,b.

The piston 52 separates well fluid (which enters the chamber 54 via a filter 58) from a clean fluid (such as, a lubricant) in the chamber and passage 56 between the piston and the annular space 44. In this example, the piston 52 is in the form of a resilient (e.g., elastomeric) ball or sphere, but other types of pistons, membranes, diaphragms, bladders or other pressure equalizers may be used in other examples.

The pressure equalizing device 50 ensures that a pressure differential will not be created across the outer and inner seals 30a,b in the event that the circumferential spacer 36 (see FIGS. 3-7) wears away and the inner seal sealingly contacts the journal surface 20a, while the outer seal maintains sealing contact with the journal outer surface. In some examples, such a pressure differential may not be entirely prevented, but may be substantially reduced.

It may now be fully appreciated that the above disclosure provides significant advancements to the art of sealing between components of well tools. In examples described above, an extended time of sealing can be achieved by preventing a seal from contacting a surface, until after another seal has been performing the sealing function in a well environment.

In particular, a well tool 10 is provided to the art by the above disclosure. In one example, the well tool 10 can include outer and inner seals 30a,b interposed between components (such as the cone 12 and the journal 20) of the well tool 10, and a circumferential spacer 36 which prevents contact between the inner seal 30b and one of the components (such as the journal 20) which displaces relative to the inner seal 30b.

The circumferential spacer 36 may comprise a material 42 having a reduced coefficient of friction as compared to a material of the inner seal 30b. In other examples, the material 42 may not have a lower coefficient friction than the inner seal 30b, but the material 42 may have a reduced abrasive wear resistance.

The outer seal 30a may be positioned between the circumferential spacer 36 and an exterior 32 of the well tool 10. In this example, well fluid has to pass the outer seal 30a in order to contact the circumferential spacer 36.

The circumferential spacer 36 may be positioned upstream of the outer seal 30a relative to a lubricant supply 24 of the well tool 10. The circumferential spacer 36 is "upstream" in that it is closer to the lubricant supply 24 than the outer seal 30a along a fluid path (such as annular space 44 and passage 26) between the lubricant supply 24 and the outer seal.

The well tool 10 can include an equalizing passage 40 which permits fluid communication across the circumferential spacer 36. The equalizing passage 40 may be formed in the circumferential spacer 36. The equalizing passage 40 can permit fluid communication between a lubricant supply 24 of the well tool 10 and a space 44 defined between the inner and outer seals 30a,b.

The circumferential spacer 36 and inner seal 30b can be separate elements of the well tool 10. In other examples, the circumferential spacer 36 and inner seal 30b could be combined as a single element. The circumferential spacer 36 may displace relative to the component 20.

The circumferential spacer 36 may be positioned between the outer seal 30a and retaining balls 22 which retain a cone 12 on a journal 20 of the well tool 10. The well tool 10 can comprise a drill bit.

Also described above is a method of sealing between components (such as the cone 12 and the journal 20) of a well tool 10. In one example, the method can include sealingly engaging an outer seal 30a between the components 12, 20, and disposing an inner seal 30b between the components 12, 20, the disposing including spacing the inner seal 30b away from one of the components 20. In this example, the inner seal 30b sealingly contacts the component 20 only after the well tool 10 is disposed in a well.

The inner seal 30b may sealingly contact the component 20 only after fluid communication is permitted across the outer seal 30a. In other examples, there may be some overlap during which both the inner and outer seals 30a,b sealingly contact the component 20.

The spacing step can include positioning a circumferential spacer 36 between the inner seal 30b and the component 20. The circumferential spacer 36 may wear away and thereby permit sealing contact between the inner seal 30b and the component 20 after the well tool 10 is disposed in the well.

A drill bit is described above as one example of a well tool 10 which can incorporate the principles of this disclosure. The drill bit can include outer and inner seals 30a,b interposed between components 12, 20 of the drill bit, and a circumferential spacer 36 which prevents contact between the inner seal 30b and one of the components 20, the circumferential spacer 36 being positioned upstream of the outer seal 30a relative to a lubricant supply 24 of the drill bit.

The drill bit can include a pressure equalizing device 50 which mitigates a pressure differential across the inner and outer seals 30a,b.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A drill bit, comprising:
    an outer seal interposed radially between a cone and a journal of the drill bit and sealingly engaged with the journal and cone, to not permit communication of well fluid across the outer seal;
    an inner seal positioned in a groove formed on either the cone or the journal not sealingly in contact with the journal and cone, and not exposed to well fluid; and
    a circumferential spacer positioned radially between the inner seal and a surface of either the cone or the journal radially opposite the groove, the circumferential spacer including a material that radially spaces apart the inner seal from the surface, wherein there is a greater coefficient of friction between the circumferential spacer and the inner seal than between the circumferential spacer and the surface, such that there is relative sliding motion between the circumferential spacer and the surface, but not relative sliding motion between the inner seal and the groove or between the inner seal and the circumferential spacer, such that the inner seal and outer seal perform their sealing functions in series time-wise, at substantially different time intervals.

2. The drill bit of claim 1, wherein the circumferential spacer is positioned upstream of the outer seal relative to a lubricant supply of the drill bit.

3. The drill bit of claim 1, further comprising an equalizing passage which permits fluid communication across the circumferential spacer.

4. The drill bit of claim 3, wherein the equalizing passage is formed in the circumferential spacer.

5. The drill bit of claim 3, wherein the equalizing passage permits fluid communication between a lubricant supply of the drill bit and a space defined between the inner and outer seals.

6. The drill bit of claim 1, wherein the circumferential spacer and the inner seal are separate elements of the drill bit.

7. The drill bit of claim 6, wherein the circumferential spacer is positioned between the outer seal and retaining balls which retain the cone on the journal.

8. The drill bit of claim 1, wherein a portion of the circumferential spacer in contact with the inner seal is textured.

9. The drill bit of claim 8, wherein the portion of the circumferential spacer in contact with the inner seal comprises protrusions and/or recesses.

10. The drill bit of claim 1, wherein a portion of the circumferential spacer in contact with the either the journal or the cone, whichever does not contain the groove in which the inner seal is positioned, is smooth.

11. The drill bit of claim 10, wherein the portion of the circumferential spacer in contact with either the journal or the cone, whichever does not contain the groove in which the inner seal is positioned, comprises poly-tetra-fluoro-ethylene (PTFE) or poly-ether-ether-ketone (PEEK)).

12. The drill bit of claim 1, wherein the circumferential spacer has a rounded side in contact with the inner seal and a flat side in contact with either the journal or the cone, whichever does not contain the groove in which the inner seal is positioned.

13. The drill bit of claim 1, wherein the circumferential spacer comprises a first arm positioned between the inner seal and either the journal or the cone, whichever does not contain the groove in which the inner seal is positioned, and a second arm positioned on a side of the inner seal facing the outer seal.

14. A method of sealing between a journal and a cone of a drill bit, the drill bit including:
    an outer seal interposed radially between a cone and a journal of the drill bit and sealingly engaged with the journal and cone to not permit communication of well fluid across the outer seal;
    an inner seal downstream from the outer seal with respect to an annular fluid entry path, positioned in a groove formed on either the cone or the journal, not sealingly in contact with the journal and cone, and not exposed to well fluid; and a circumferential spacer positioned radially between the inner seal and a surface of either the cone or the journal radially opposite the groove, the circumferential spacer including a material that radially spaces apart the inner seal from the surface, wherein there is a greater coefficient of friction between the circumferential spacer and the inner seal than between the circumferential spacer and the surface, such that there is relative sliding motion between the circumferential spacer and the surface, but not relative sliding motion between the inner seal and groove or between the inner seal and the circumferential spacer;

the method comprising:

rotating the cone about the journal until the outer seal fails and communication of well fluid is permitted across the outer seal;

wearing away the circumferential spacer by the well fluid; and sealingly engaging the inner seal radially between the journal and the cone only after well fluid communication is permitted across the outer seal and the circumferential spacer is worn away to permit contact between the inner seal and either the journal or cone, such that the inner seal and outer seal perform their sealing functions in a series time-wise, at substantially different time intervals.

15. The method of claim 14, further comprising lubricant flow across the circumferential spacer to or from a space defined between the inner seal and outer seal via an equalizing passage in the circumferential spacer.

16. The method of claim 14, wherein the circumferential spacer experiences higher friction between itself and the inner seal than between itself and either the journal or the cone when used to drill a wellbore.

* * * * *